United States Patent
Kajitani (10) Patent No.: US 7,168,676 B2
(45) Date of Patent: Jan. 30, 2007

(54) TWO-PORT VALVE FOR VACUUM OPERATION

(75) Inventor: Masao Kajitani, Ibaraki (JP)

(73) Assignee: SMC Corporation, Tokyo (JP)

( * ) Notice: Subject to any disclaimer, the term of this patent is extended or adjusted under 35 U.S.C. 154(b) by 110 days.

(21) Appl. No.: 11/118,655

(22) Filed: Apr. 29, 2005

(65) Prior Publication Data

US 2005/0242312 A1    Nov. 3, 2005

(30) Foreign Application Priority Data

Apr. 30, 2004 (JP) ............................. 2004-136351
Nov. 30, 2004 (JP) ............................. 2004-346989

(51) Int. Cl.
*F16K 31/00* (2006.01)
(52) U.S. Cl. ..................... 251/63.6; 251/285
(58) Field of Classification Search ................. 251/26, 251/31, 63.5, 63.6, 284, 285
See application file for complete search history.

(56) References Cited

U.S. PATENT DOCUMENTS 6,244,563 B1 * 6/2001 Ejiri ........................ 251/63.6
6,494,229 B2 * 12/2002 Kajitani ...................... 137/530
6,814,338 B2 * 11/2004 Kajitani ...................... 251/63.6

FOREIGN PATENT DOCUMENTS

JP         08-166085         6/1996

\* cited by examiner

*Primary Examiner*—Eric Keasel
*Assistant Examiner*—John K. Fristoe, Jr.
(74) *Attorney, Agent, or Firm*—Peter Ganjian (57) ABSTRACT

Disclosed is a two-port valve in which a fluid passage between two ports is gradually openable without a rapid flow rate, by stepwise lifting a valve member off a valve sent using two pistons, to open the valve in a phased manner. A cylinder portion 2 for driving a valve member 4 has a first piston 24 through which a valve shaft 11 slidably extends, a sleeve 35 movably disposed in a second pressure chamber 27 to limit an operating stroke of the first piston 24, and a second piston 37 slidably disposed in the sleeve 35 and connected to the shaft 11. In an initial phase of opening of the valve, the pistons 24, 37 acting like a unit are together moved to a position at which the first piston 24 contacts the sleeve 35, to slightly open the valve member 4. Thereafter, the valve member 4 is moved by the second piston 37 to its fully open position.

13 Claims, 10 Drawing Sheets

TWO-PORT VALVE FOR VACUUM OPERATION

BACKGROUND OF THE INVENTION

1. Field of the Invention

The present invention relates to a two-port valve for a vacuum operation, which is used for evacuating a vacuum chamber for chemical reaction in a physical or chemical machine or the like, for instance.

2. Description of the Prior Art

For instance, where a vacuum chamber for chemical reaction in a physical or chemical machine or the like is evacuated by a vacuum pump, when the gas in the chamber at a relatively high pressure (i.e., at or near the atmospheric pressure) is rapidly discharged, a turbulence of the gas occurs inside the vacuum chamber since a large volume of the gas flows all at once, stirring up particles adhered to an inner wall of the chamber and/or others, which may disturb an operation of processing. Further, the vacuum pump tends to suffer from an overload.

Therefore, there has been proposed a two-port valve which connects between a vacuum chamber and a vacuum pump, and comprises a main valve mechanism relatively widely openable and an auxiliary valve mechanism relatively narrowly openable, as disclosed in JP-A-8-166085, for instance. In an initial discharge phase, a fluid passage between the vacuum chamber and the vacuum pump is opened limitedly by the auxiliary valve mechanism to slowly discharge the gas in the vacuum chamber. When the inner pressure of the vacuum chamber is decreased to a sufficiently low level, the fluid passage is widely opened by the main valve mechanism to fully discharge the gas.

However, this conventional two-port valve having the two valve mechanisms, namely, the main and auxiliary valve mechanisms, is relatively complex in structure, and requires a lot of time and works to design and manufacture, and as well as a slightly higher manufacturing cost.

SUMMARY OF THE INVENTION

An object of the invention is, therefore, to provide a two-port valve which is simple in structure and capable of gradually opening a fluid passage between two ports without causing a rapid change in flow rate in the fluid passage.

To attain the object, the invention provides a two-port valve for a vacuum system, comprising: an axis; a main valve portion comprising: a first main port; a second main port; a fluid passage connecting the first and second main ports; a valve seat disposed in the fluid passage; a valve member to be seated on and separated from the valve seat; and a valve shaft extending along the axis from the valve member; and a cylinder portion connected to the main valve portion along the axis, and comprising: a cylinder housing defining a piston chamber therein into which the valve shaft extends; a first piston which is slidably disposed in the piston chamber, and has a front end on the side of the main valve portion and a rear end on the side opposite to the main valve portion, the valve shaft slidably extending through a central portion of the first piston; a sleeve which is disposed in the piston chamber to be movable along the axis and limit an operating stroke of the first piston by being brought into contact with the rear end of the first piston; a positioning member which determines the position of the sleeve; a second piston which is slidably disposed in the sleeve and connected to the valve shaft so as to be in contact with the first piston when the valve member is seated on and valve seat; a first pressure chamber for driving the first piston; a second pressure chamber for driving the second piston; a first pilot port in communication with the first pressure chamber; and a second pilot port in communication with the second pressure chamber.

The valve may be arranged such that the positioning member is attached at an end of the piston chamber in the cylinder housing to be movable in the axial direction by being operated or rotated around the axis, and an end of the positioning member is held in contact with an end of the sleeve.

It is preferable that the two-port valve further comprises a calibration plate which is attached at an external end face of the positioning member to be rotatable around the axis, and has graduation marks radially arranged thereon, and the cylinder housing has a pointer for pointing the graduation marks on the graduation plate.

An operating stroke of the first piston may be smaller than that of the second piston.

The valve shaft may have an indicator for indicating that the valve member is at its fully opening position.

According to another aspect of the invention, there is provided a two-port valve for vacuum operation, comprising: an axis; a main valve portion comprising: a first main port; a second main port; a fluid passage connecting the first and second main ports; a valve seat disposed in the fluid passage; a valve member to be seated on and separated from the valve seat to close and open the valve; and a valve shaft extending along the axis from the valve member; and a cylinder portion connected to the main valve portion along the axis, and comprising: a cylinder housing defining a piston chamber therein into which the valve shaft extends; a sleeve which is movably disposed in the piston chamber and determines an initial opening position of the first piston; a positioning member which determines the position of the sleeve; a second piston which is slidably disposed in the sleeve and connected to the valve shaft; a first piston which is slidably disposed in the piston chamber, and drives the second piston to an initial opening position of the second piston which corresponds to the initial opening position of the first piston determined by the sleeve, in an initial phase of opening of the valve; a first pressure chamber for driving the first piston; a second pressure chamber for driving the second piston; a first pilot port in communication with the first pressure chamber; and a second pilot port in communication with the second pressure chamber.

According to this aspect of the invention, the first piston may have a front end on the side of the main valve portion and a rear end on the side opposite to the main valve portion, the sleeve and the second piston are disposed on the side of the rear end of the first piston, and the valve shaft slidably extends through a central portion of the first piston.

The two-port valve may further comprise a position detector for detecting an operating position of the first piston during the initial phase of opening of the first piston.

It is desirable that the position detector detects the operating position of the first piston during the initial phase of the opening of the valve via one of the sleeve and the second piston.

In the two-port valve according to the invention, while the valve member is seated on the valve seat and the first and second pistons are held in contact with each other to act like a unit, when the first piston is moved to the initial opening position determined by the sleeve, the second piston together moves to a position corresponding to the initial opening position of the first piston, thereby separating the valve member off the valve seat by a slight distance corresponding to the stroke or distance by which the second piston is moved. Thus, "initial opening" of the valve is made. Then, the second piston is operated to further lift the valve member away from the valve seat to eventually fully open the valve.

In this way, it is enabled to gradually open the fluid passage between the two ports without causing a rapid change in flow rate, by driving the valve member stepwise using the two pistons to open the valve in a phased manner.

DESCRIPTION OF THE PREFERRED EMBODIMENTS

In FIGS. 1–5 is shown a two-port valve according to a first embodiment of the invention, and denoted by reference symbol A. The two-port valve A comprises a main valve portion 1 including a valve member 4 for opening and closing a fluid passage 5, and a cylinder portion 2 for operating the valve member 4 to open and close the two-port valve A. The main valve portion 1 and the cylinder portion 2 are connected in series along an axis L of the valve A.

Figure 1:
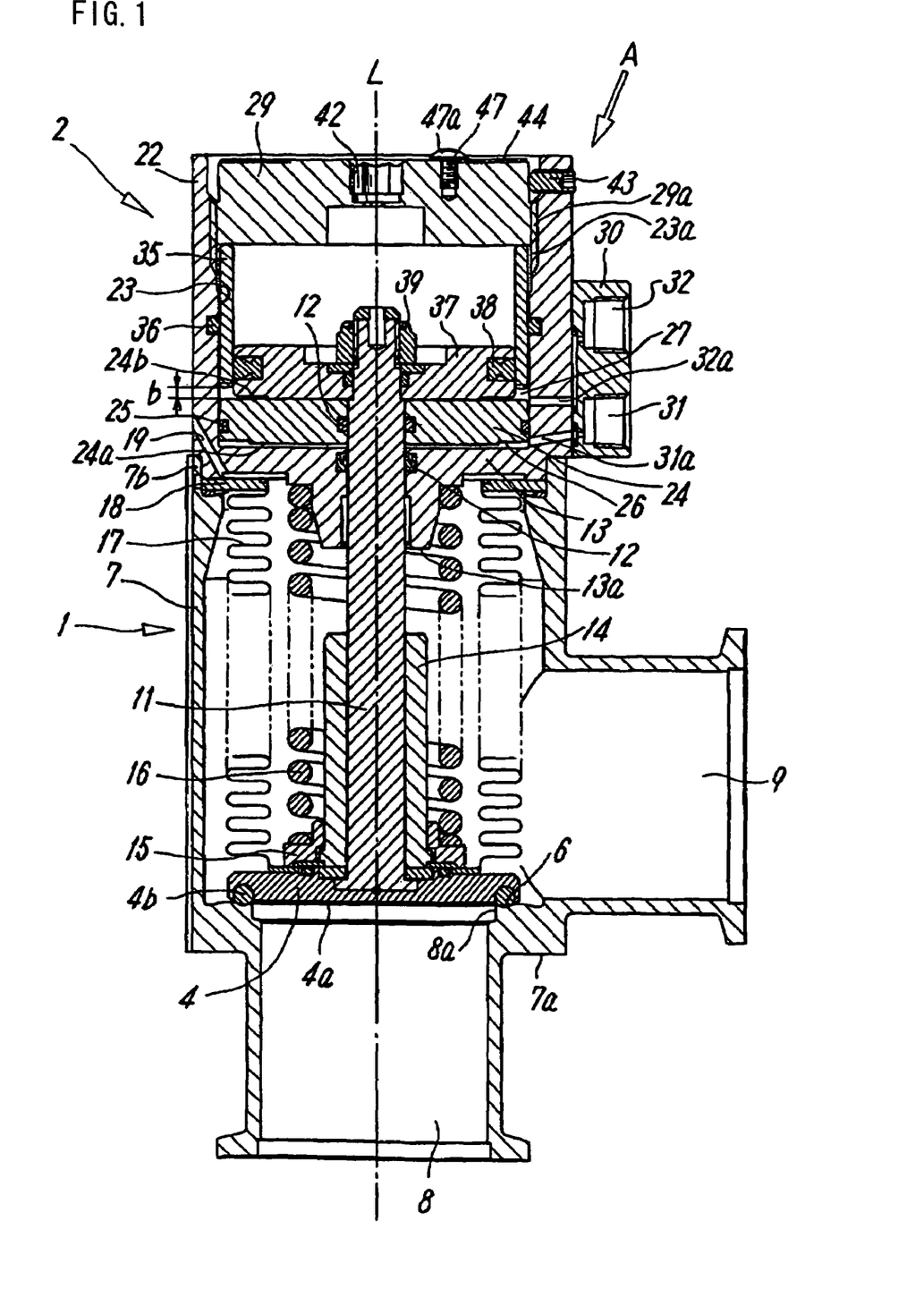
FIG. 1 is a cross-sectional view of a two-port valve according to a first embodiment of the invention, in its closed state.

The main valve portion 1 includes a hollow housing 7 having a substantially prismatic or cylindrical shape. The valve housing 7 has a first main port 8 and a second main port 9 one of which is connected to one of a vacuum chamber and a vacuum pump, and the other of which is connected to the other of the vacuum chamber and vacuum pump. The first main port 8 is open along the axis L, at a first one 7a of two opposite ends of the valve housing 7, while the second main port 9 is open in a direction perpendicular to the axis L in a side surface of the valve housing 7. Inside the valve housing 7, there is formed the fluid passage 5 which connects the two main ports 8, 9, and a valve seat 6 is disposed in the fluid passage 5. The first main port 8 is open to the fluid passage 5 at its opening 8a, around which the valve seat 6 is formed.

In the valve housing 7, the valve member 4, which is of poppet type, is disposed coaxially with the valve seat 6 to be seated on and lifted off the valve seat 6 to close and open the two-port valve A. This valve member 4 has a shape of a circular disc having a substantially flat end face 4a. At a peripheral portion of the end face 4a, there is attached an annular valve sealing member 4b of rubber, which is brought into contact with, and lifted away from, the valve seat 6. There is no part or member which protrudes farther than the valve sealing member 4b from the end face 4a of the valve member 4.

At a central portion of a rear face of the valve member 4, there is attached a base end of a valve shaft 11 extending along the axis L in the valve housing 7. The valve shaft 11 extends through a partition wall 13 which separates the main valve portion 1 from the cylinder portion 2, such that the valve shaft 11 is air-tightly slidable with respect to the partition wall 13 via a sealing member 12, and a rear end of the valve shaft 11 extends out into a piston chamber 23 of the cylinder portion 2.

A cylindrical stopper 14 determining a fully opening position of the valve member 4 is attached to the rear face of the valve member 4 to surround the base end of the valve shaft 11. The stopper 14 extends from the rear face of the valve member 4 along the valve shaft 11 in a length, and an end of the stopper 14 is brought into contact with a contact portion 13a in an end face of the partition wall 13, when the valve member 4 is moved to its fully opening position. A spring seat 15 is disposed on the rear face of the valve member 4, and a return spring 16 biasing the valve member 4 in a direction to close the valve is disposed between the spring seat 15 and the partition wall 13.

On the rear face of the valve member 4, a bellows 17 contractible and expansible is also disposed to surround the valve shaft 11, stopper 14, and return spring 16. The bellows 17 is made of a corrosion-resistant material such as an anticorrosion metal, and an end of the bellows 17 is attached to the rear face of the valve member 4 while the opposite end of the bellows 17 is attached to a support plate 18 disposed between an end portion of the valve housing 7 and the partition wall 13. The bellows 17 contracts and expands in accordance with the upward and downward movement of the valve member 4 to open and close the two-port valve A. A space inside the bellows 17 is open to the outside through an air vent 19 formed in the valve housing 7.

The cylinder portion 2 has a cylinder housing 22 coaxially connected to a second end 7b of the valve housing 7. The cylinder housing 22 has a generally prismatic or cylindrical shape identical with that of the valve housing 7. The partition wall 13 is disposed at an end of the cylinder housing 22 in the direction of the axis L (hereinafter referred to as "the axial direction"), thereby separating the valve housing 7 from the cylinder housing 22. The piston chamber 23 extending along the axis L is defined in the cylinder housing 22. In the piston chamber 23, which is a circular bore, are accommodated a first piston 24 having a shape of a circular disc, and a cylindrical sleeve 35, such that the first piston 24 and the sleeve 35 are arranged in series along the axis L and slidable in the axial direction via sealing members 25, 36, respectively.

The first piston 24 is closer to the main valve portion 1 than the sleeve 35, and has two surfaces opposite in the axial direction, namely, a front end surface 24a facing the main valve portion 1, and a rear end surface 24b facing the opposite side. A first pressure chamber 26 for driving the first piston 24 is formed between the front end surface 24a and the partition wall 13. The valve shaft 11 extends through a central portion of the first piston 24 such that the valve shaft 11 is slidable relatively to the first piston 24 via the sealing member 12, and the end of the valve shaft 11 extends toward the side of the rear end surface 24b or into the space inside the sleeve 35.

Figure 2:
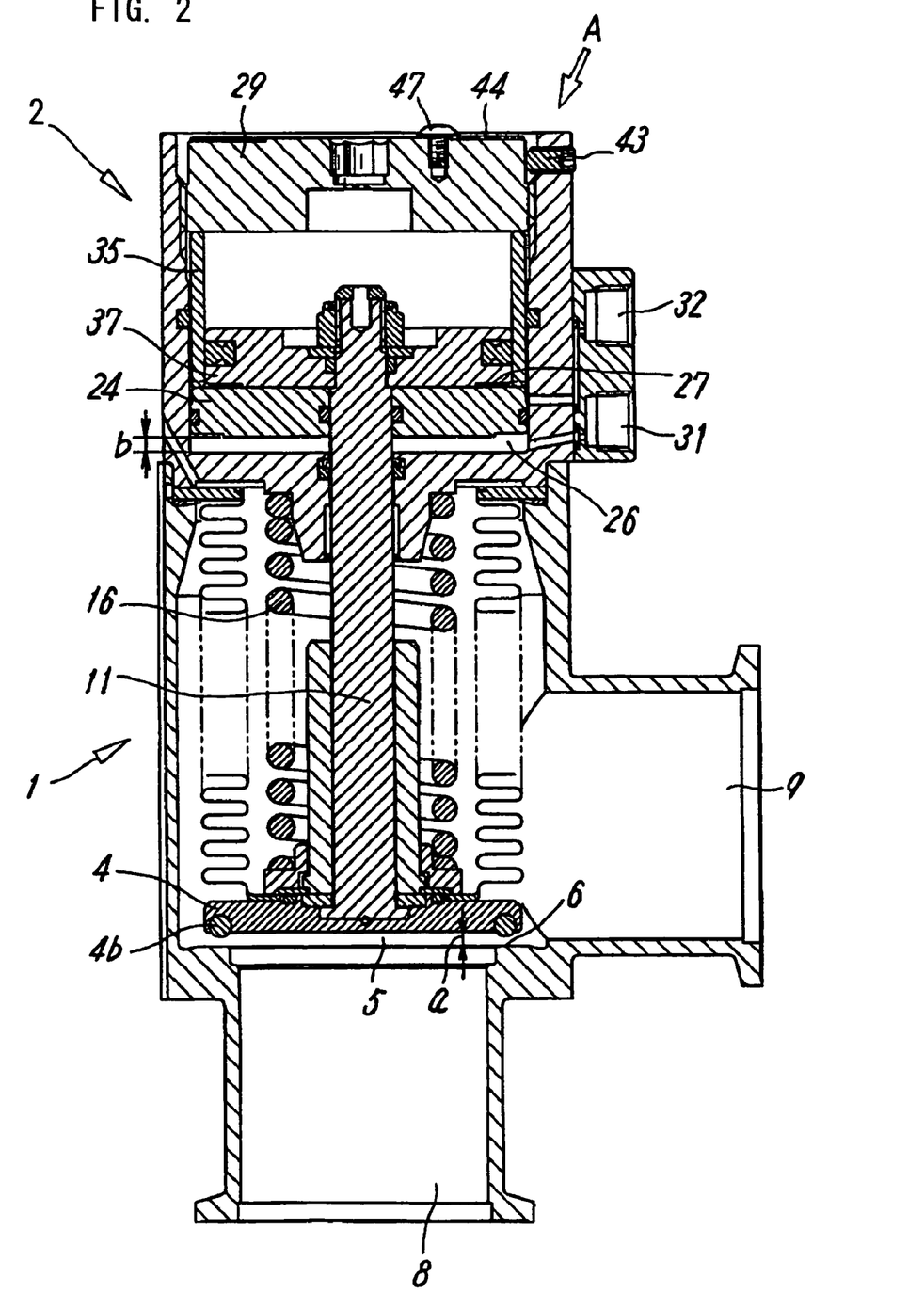
FIG. 2 is a cross-sectional view of the two-port valve in an initial phase of opening thereof.

The sleeve 35 has a substantially same external diameter as the first piston 24. The position of the sleeve 35 is determined by a positioning member 29 disposed on the side of the rear end surface 24b of the first piston 24 and attached at an end of the piston chamber 23 such that the position of the positioning member 29 is adjustable. An operating stroke b of the first piston 24 is delimited by contact of the first piston 24 with a front end of the sleeve 35 positioned by the positioning member 29. The operating stroke b of the first piston 24 as defined by the sleeve 35 is equal to an initial opening amount or distance a by which the valve member 4 is lifted off the valve seat 6 in an initial phase of opening of the two-port valve A, as shown in FIG. 2.

In the sleeve 35, there is also accommodated a second piston 37 such that the second piston 37 is slidable in the axial direction relatively to the sleeve 35 via a sealing member 38, and fixedly connected to an end of the valve shaft 11 with a nut 39. Between the second piston 37 and the first piston 24 is formed a second pressure chamber 27 for driving the second piston 37. When pilot air is supplied to the second pressure chamber 27, the second piston 37 is operated to separate the valve member 4 off the valve seat 6 through the valve shaft 11, thereby opening the opening 8a or the two-port valve A. While the pilot air is not supplied to the second pressure chamber 27, the second piston 37 is biased onto the first piston 24 by the force of the return spring 16 such that the first piston is sandwiched between the second piston 37 and the partition wall 13, or such that there is a clearance corresponding to the first pressure chamber 26 between the first piston 24 and the partition wall 13, with the two pistons 24, 37 being held in contact with each other to act like a unit in either case, as shown in FIGS. 1 and 2. When the pilot air is supplied to the first pressure chamber 26 while the two-port valve A is in this state, the two pistons 24, 37 acting like a unit are moved to a position where the first piston 24 is brought into contact with the sleeve 35.

The operating strokes of the pistons 24, 37 are set such that the operating stroke b of the first piston 24 is smaller than that of the second piston 37.

The second piston 37 has a diameter smaller than that of the first piston 24 by a dimension corresponding to the thickness of the sleeve 35. Accordingly, the pressure-receiving area of the second piston 37 is slightly smaller than that of the first piston 24.

A rectangular port block 30 is attached to a side surface of the cylinder housing 22 at a position near the housing 7. The port block 30 has a first pilot port 31 and a second pilot port 32. The first pilot port 31 is in communication with the first pressure chamber 26 through a communication hole 31a, while the second pilot port 32 is in communication with the second pressure chamber 27 through a communication hole 32a.

The positioning member 29 is a member having a short columnar shape such that its length in the axial direction is smaller than its diameter, and an end portion of the positioning member 29 is externally threaded to form an external thread 29a which is screwed into an internal thread 23a formed at an end portion of the piston chamber 23. The positioning member 29 is thus coaxially attached to the end portion of the cylinder housing 22, while an end of the positioning member 29 is held in contact with a rear end of the sleeve 35. At a center of an external end surface of the positioning member 29 in the axial direction, a hexagonal operation hole 42 is formed. The position of the positioning member 29 in the axial direction, which determines the position of the sleeve 35, is adjusted by inserting a tool such as a wrench into the operation hole 42 and rotating the wrench around the axis L. The thus positioned positioning member 29 is fixed there, by screwing in a setscrew 43 at a position in the side surface of the cylinder housing 22 to engage the setscrew 43 with a side of the positioning member 29. The positioning member 29 also serves as an end block closing an end of the piston chamber 23.

Figure 4:
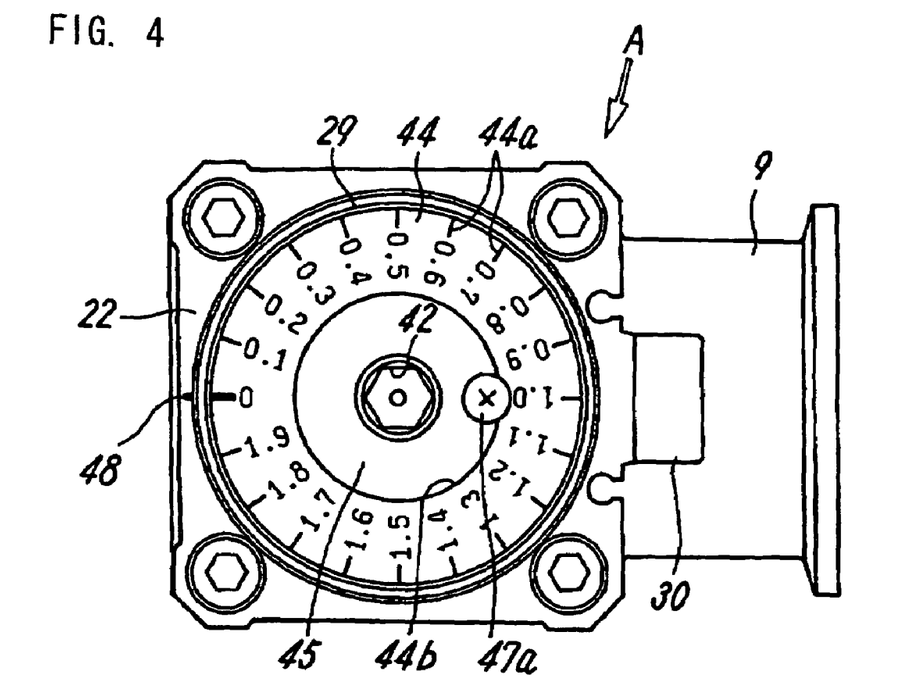
FIG. 4 is a top plan view of the two-port valve of FIG. 1, showing a state where an amount of initial opening is yet to be set.

As shown in FIG. 4, a calibration plate 44 indicating an operating stroke of the first piston 24 is attached to the external end surface of the positioning member 29. The calibration plate 44 is annular, that is, there is a circular hole 44b at a central portion of the calibration plate 44, and graduation marks 44a are equiangularly arranged on an upper surface of the calibration plate 44. A circular protruding portion 45 of the external end surface of the positioning member 29 is fitted in the circular hole 44b. In this way, the calibration plate 44 is attached to the positioning member 29 such that the calibration plate 44 is rotatable around the axis L. At a peripheral place in the circular protruding portion 45, there is attached a cap screw 47 with a portion of a head 47a of the cap screw 47 on the calibration plate 44, so that the calibration plate 44 is fixable at a desired rotational position by tightening the cap screw 47 to hold down the calibration plate 44 with the head 47a thereof.

On the other hand, on an external end surface of the cylinder housing 22 and adjacent the calibration plate 44, there is disposed a pointer 48 for pointing the graduation marks.

Figure 3:
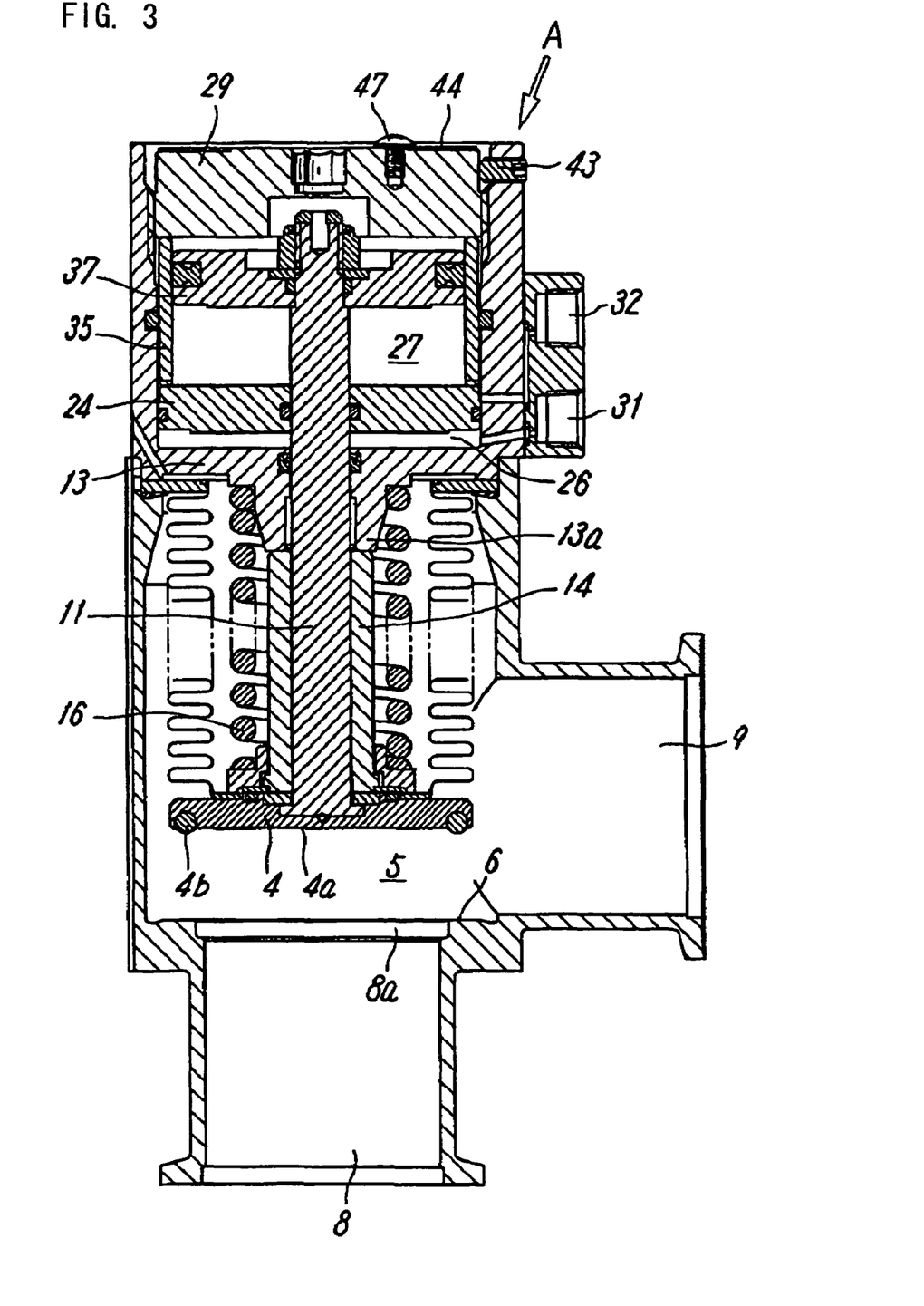
FIG. 3 is a cross-sectional view of the two-port valve of FIG. 1, in its fully opened state.

In the two-port valve A constructed as described above, the valve member 4 is stepwise opened using the first and second pistons 24, 37, from its closed state shown in FIG. 1 to its fully opened state shown in FIG. 3 via its initial opening state shown in FIG. 2. In operation, the amount a of the initial opening of the two-port valve A, or the amount by which the valve member 4 is lifted by operation of the first piston 24 in the initial phase of opening of the two-port valve A is set as follows.

Figure 5:
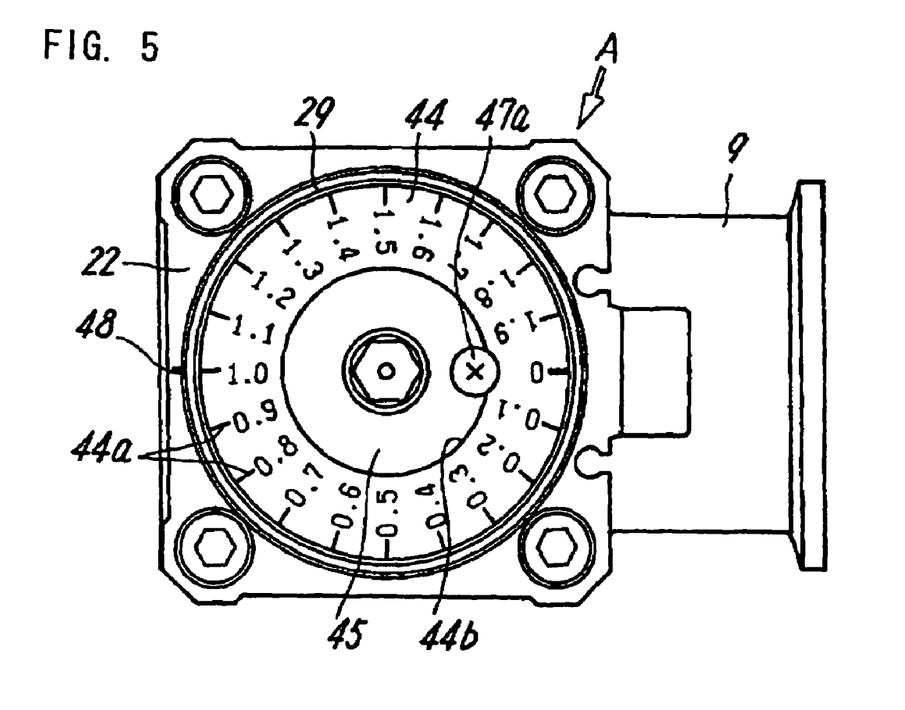
FIG. 5 is a top plan view of the two-port valve of FIG. 1, showing a state where an amount of initial opening has been set.

That is, during the two-port valve A is in the closed state where the first and second pressure chambers 26, 27 are both in the evacuated state and the valve member 4 is seated on the valve seat 6, as shown in FIG. 1, the positioning member 29 is rotated with the tool such as a hexagonal wrench to be advanced, thereby pushing the sleeve 35 to bring it into contact with the first piston 24. Then, the calibration plate 44 is rotated to align a graduation mark "0" with the pointer 48, as shown in FIG. 4, and the cap screw 47 is tightened to fix the calibration plate 44 at this position. Subsequently, the positioning member 29 is rotated in the reverse direction to retract it by a distance corresponding to the initial opening amount a as shown in FIG. 2, which distance can be established by aligning a graduation mark indicating a desired value with the pointer 48, and the setscrew 43 is tightened to fix the positioning member 29 at the current position. The initial opening amount a is thus set. Since the calibration plate 44 is rotated with the positioning member 29, the one of the graduation marks 44a representative of the initial opening amount a is indicated by the pointer 48, as shown in FIG. 5. The front end of the sleeve 35 is brought into contact with the first piston 24, while its rear end is away from the positioning member 29 by a distance corresponding to the initial opening amount a.

In this state, while the second pilot port 32 is held in the evacuated state, the first pressure chamber 26 is supplied with pilot air through the first pilot port 31. This moves the first piston 24 and the second piston 37 which are acting like a unit, pushing the sleeve 35, as shown in FIG. 2. The movement of the sleeve 35 stops when the rear end of the sleeve 35 is brought into contact with the positioning member 29. During this process, the valve member 4 is lifted, by way of the valve shaft 11 connected to the second piston 37, away from the valve seat 6 by a distance corresponding to the operating stroke b of the first piston 24, thereby obtaining the initial opening of the two-port valve A. That is, the initial opening amount a equals the operating stroke b of the first piston 24.

Thereafter, while the pilot air is kept supplied to the first pressure chamber 26, the second pressure chamber 27 is supplied with pilot air through the second pilot port 32. This moves the second piston 37 separately from the first piston 24, as shown in FIG. 3, further lifting the valve member 4 by the valve shaft 11 eventually to its fully open position to fully open the two-port valve A. The fully open position of the valve member 4 is determined by the end of the stopper 14 on the rear face of the valve member 4 being brought into contact with the contact portion 13a of the partition wall 13.

In this way, the two pistons 24, 37 are used to stepwise drive the valve member 4 away from the valve seat 6 to open the two-port valve A in a phased manner. Accordingly, the fluid passage 5 between the two main ports 8, 9 is gradually opened, without causing a rapid change in flow rate in the fluid passage 5. Use of the present two-port valve for evacuating a vacuum chamber for chemical reaction in a physical or chemical machine or the like, enables to limitedly open the fluid passage in an initial phase of evacuation to slowly discharge the gas in the vacuum chamber to decrease the internal pressure of the chamber down to a sufficiently low level, and then widely open the fluid passage to fully discharge the gas, resolving the problems such as stirring up of the particles due to a turbulence of the discharged gas.

To close the two-port valve A in the open state shown in FIG. 3, the pilot air in the second pressure chamber 27 is first discharged and then the pilot air in the first pressure chamber 26 is discharged. Alternatively, the pilot air in both the first and second pressure chambers 26, 27 is discharged at once. Where the former, stepwise operation is employed, at the timing the pilot air in the second pressure chamber 27 has been discharged, the second piston 37 is returned to the position to be brought into contact with the first piston 24 by the force of the return spring 16, as shown in FIG. 2. That is, the valve member 4 returns to the position to be located in the initial opening phase. Thereafter, when the pilot air in the first pressure chamber 26 has been discharged, the two pistons 24, 37 acting like a unit are together returned to the position as shown in FIG. 1, thereby bringing the valve member 4 into contact with the valve seat 6 to close the two-port valve A. On the other hand, where the latter, concurrent operation is employed, the above-described restoring movements concurrently and continuously take place.

Figure 6:
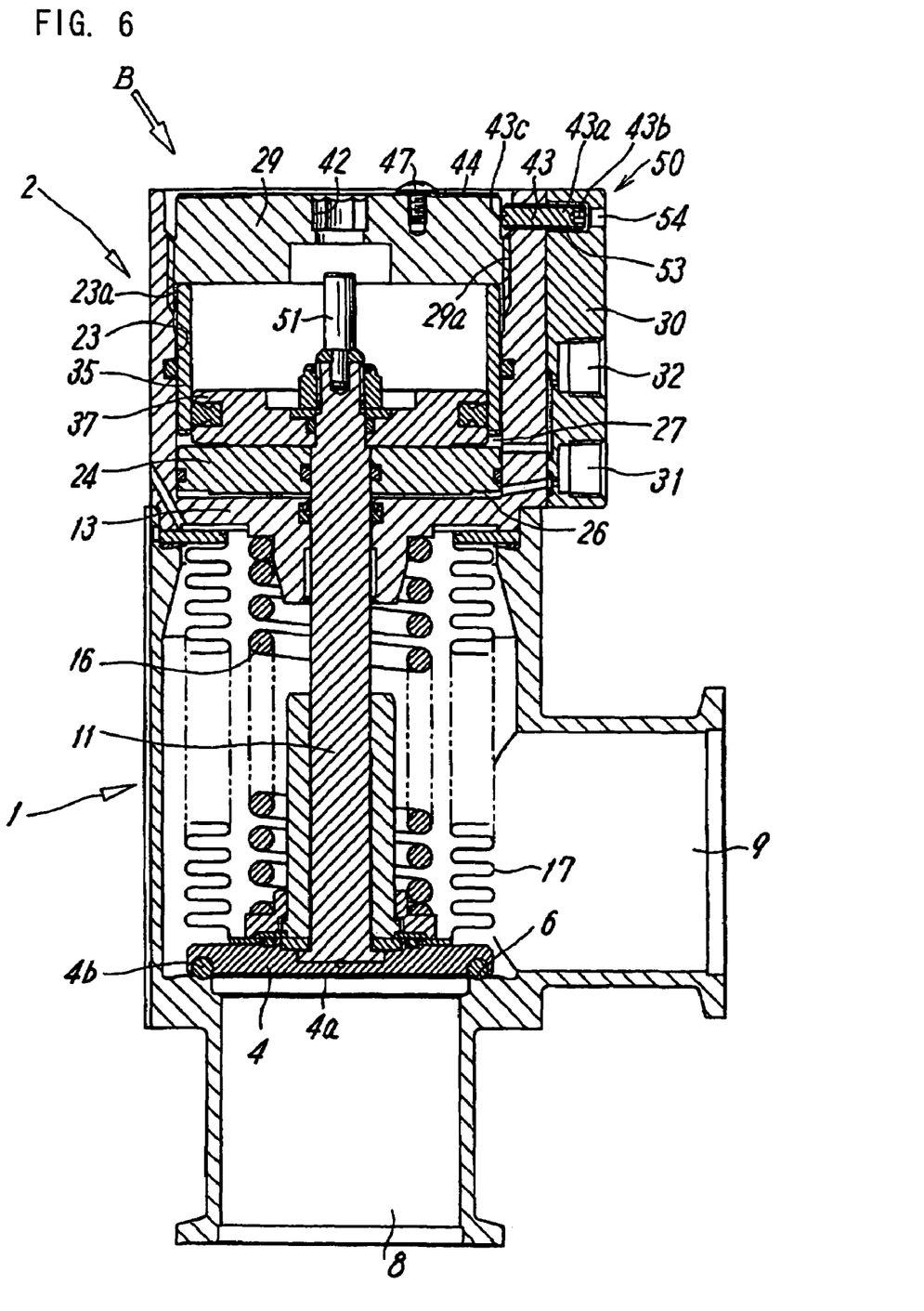
FIG. 6 is a cross-sectional view of a two-port valve according to a second embodiment of the invention, in its closed state.
Figure 7:
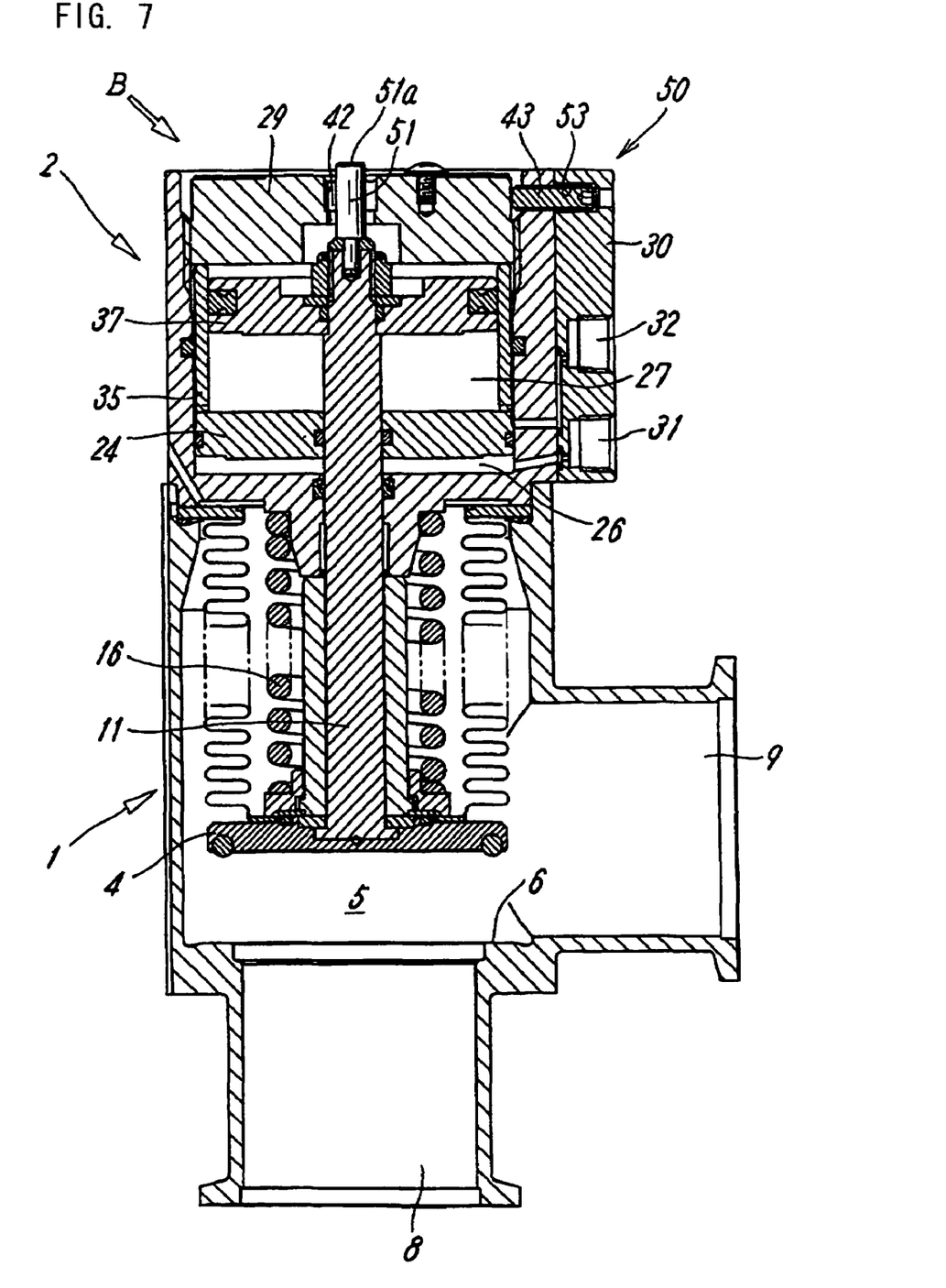
FIG. 7 is a cross-sectional view of the two-port valve of FIG. 6.

In FIGS. 6 and 7, there is shown a two-port valve according to a second embodiment of the invention, which is denoted by reference numeral B. The two-port valve B of the second embodiment differs from the two-port valve A of the first embodiment in that there are provided a retaining mechanism 50 for determining a retracted position of a setscrew 43 for fixing a positioning member 29, and an indicator 51 for indicating that a valve member 4 is at its fully open position where appropriate.

The retaining mechanism 50 is constituted by a port block 30 attached to a side surface of a cylinder housing 22. That is, the port block 30 is formed to extend to the position where the setscrew 43 is attached, and have a recess 53 at a position corresponding to the setscrew 43. A head 43a of the setscrew 43 protruding from the cylinder housing 22 is fitted in the recess 53. Thus, the head 43a is covered by the port block 30. Through a bottom wall of the recess 53, there is formed a window 54 whose diameter is smaller than an external diameter of the setscrew 43. A tool such as a screw driver or wrench is inserted through the window 54 into an operation hole 43b to screw in or down the setscrew 43. The depth of the recess 53 is set such that when the setscrew 43 is screwed down to a position where the head 43a is retracted to the maximum to be brought into contact with the bottom wall of the recess 53, an end 43c of the setscrew 43 is located at a position off the side of the positioning member 29 but engageable with the external screw 29a formed at the end portion of the positioning member 29.

The provision of the retaining mechanism 50 reliably prevents the setscrew 43 from coming off the cylinder housing 22, due to excessive loosening of the setscrew 43, as well as in a case where the positioning member 29 is rotated in the reverse or counterclockwise direction in an excessive amount while the setscrew 43 is loosened.

The indicator 51 is a narrow rod-shaped member circular or polygonal in cross section, and coaxially attached to an end of the valve shaft 11 to be displaced with the valve shaft 11. When the valve member 4 or valve shaft 11 is at its fully open position, as shown in FIG. 7, the indicator 51 is placed at its indicating position where its end portion slightly protrudes from an open end of an operation hole 42 in the positioning member 29, or is adjacent the open end. Preferably, the indicator 51 is colored in a striking color such as red, orange and yellow, at least at an end face 51a thereof.

This is because of that when the valve member 4 or valve shaft 11 is not at the fully open position shown in FIG. 7, in other words, when the valve member 4 or valve shaft 11 is at the fully closing position as shown in FIG. 6 or the initial opening position shown in FIG. 2, the indicator 51 is retracted inward, away from the operation hole 42, and not easily seeable from the outside.

The two-port valve B of the second embodiment is substantially identical with the two-port valve A of the first embodiment except the points described above. The identical elements or parts are denoted by the same reference numerals as used in the first embodiment and description thereof is dispensed with.

Figure 8:
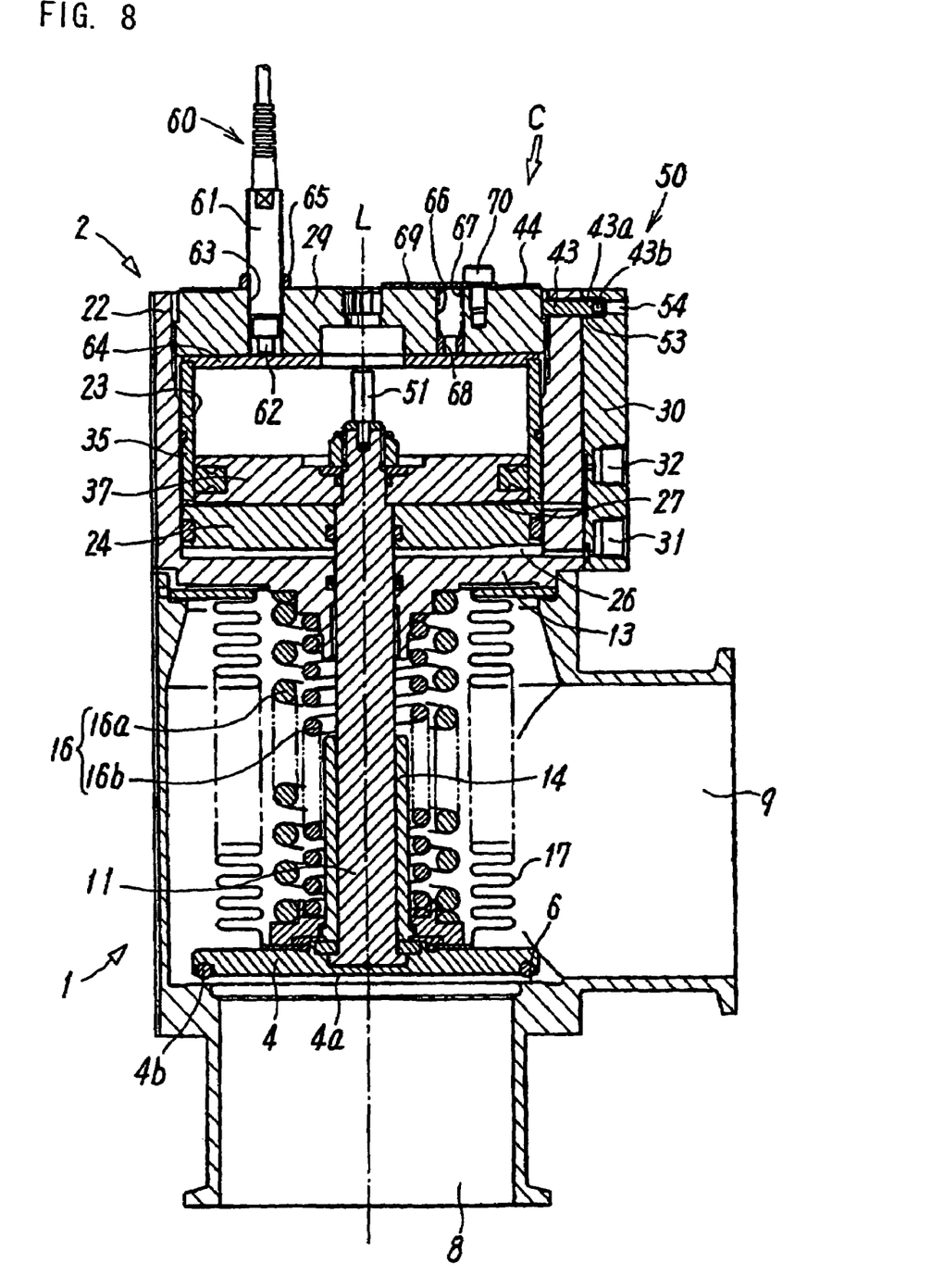
FIG. 8 is a cross-sectional view of a two-port valve according to a third embodiment of the invention, in an initial phase of opening thereof.
Figure 9:
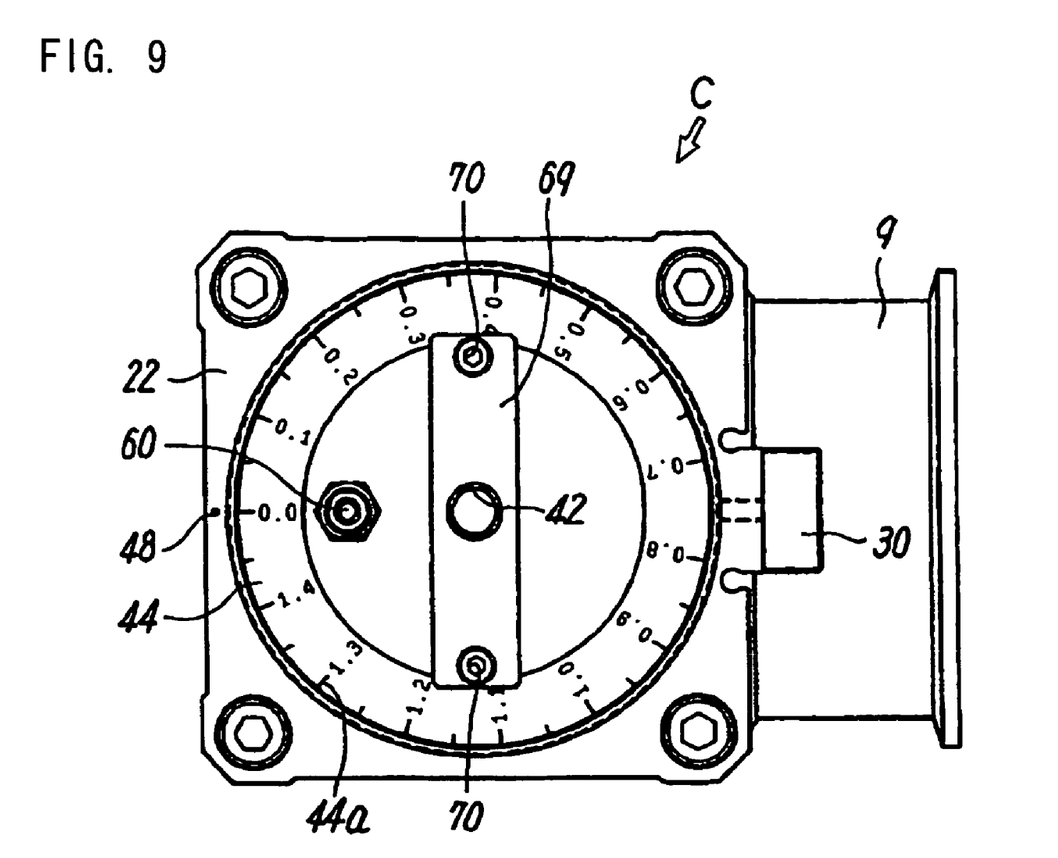
FIG. 9 is a top plan view of the two-port valve of FIG. 8.
Figure 10:
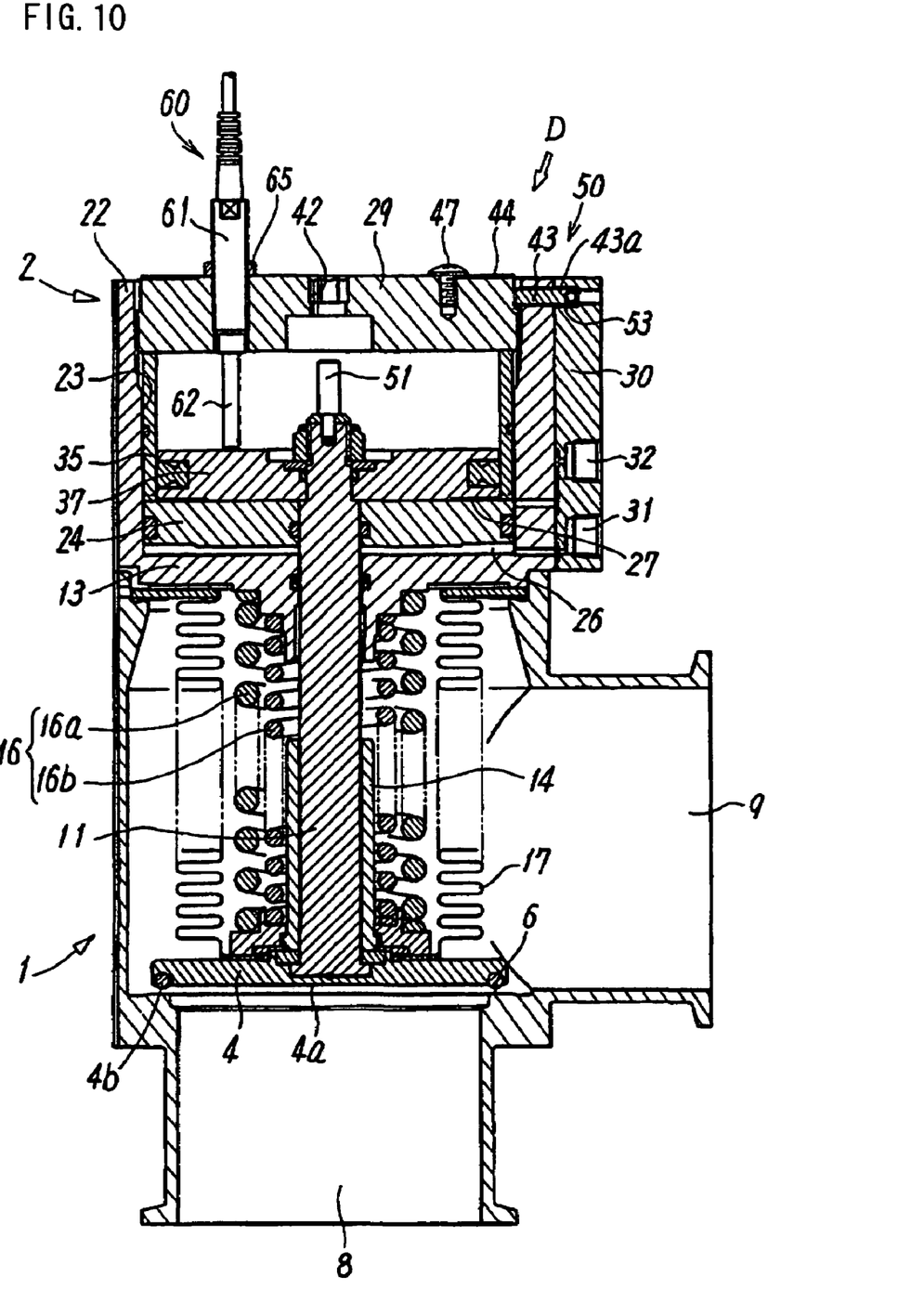
FIG. 10 is a cross-sectional view of a two-port valve according to a fourth embodiment of the invention, in an initial phase of opening thereof.
Figure 11:
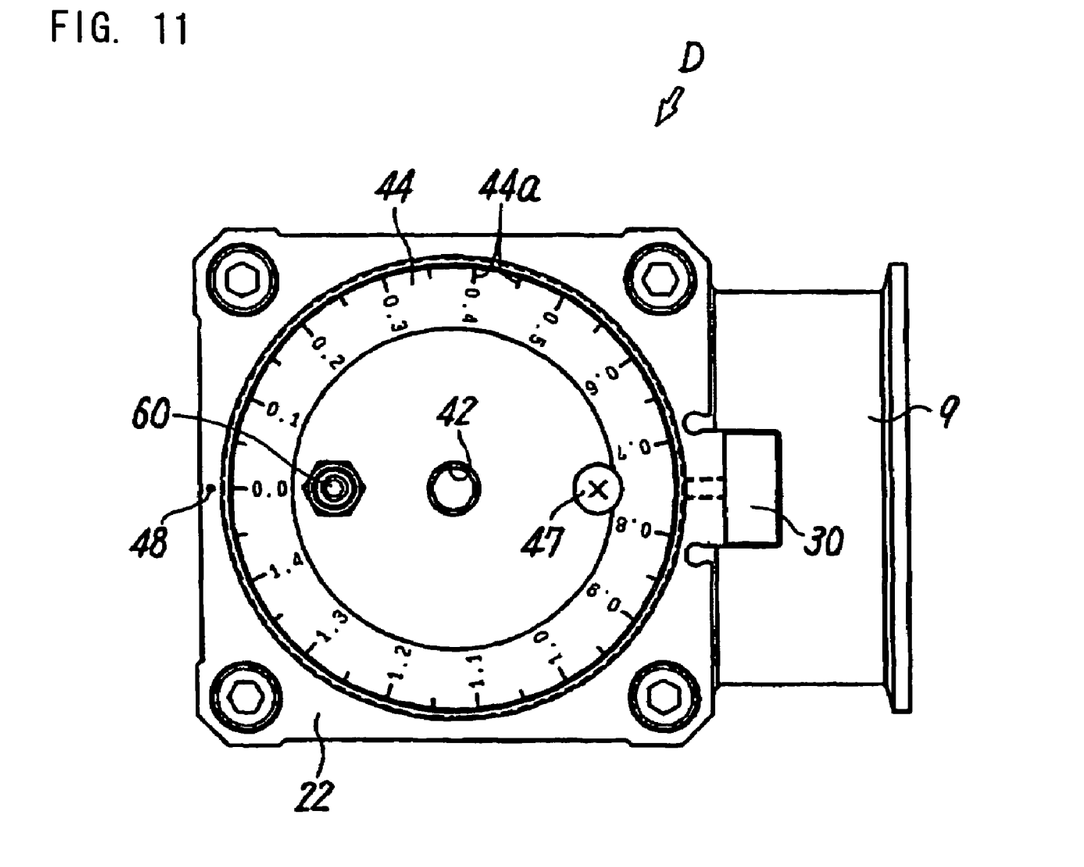
FIG. 11 is a top plan view of the two-port valve of FIG. 10.

In FIGS. 8 and 9 is shown a two-port valve according to a third embodiment of the invention, which is denoted by reference numeral C, while FIGS. 10 and 11 show a two-port valve according to a fourth embodiment of the invention, which is denoted by reference numeral D. A main difference of the two-port valves C, D of the third and fourth embodiments from the two-port valve B of the second embodiment is that the two-port valves C, D have a position detector 60 for detecting an operating position of the first piston 24 during the initial opening phase. Therefore, there will be described the position detector 60 in the two-port valves C, D of the third and fourth embodiments, and a structure related thereto. In the following description and relevant drawings, the elements or parts and functional portions identical with those of the two-port valves A, B of the first and second embodiments are denoted by the same names and reference numerals, and detailed description thereof is dispensed with.

Initially, the two-port valve C of the third embodiment will be described. The two-port valve C has the position detector 60 which detects an operating position of a first piston 24 via a sleeve 35, and is attached to a positioning member 29. The position detector 60 is of contact type and comprises an externally threaded cylindrical body 61 and a contact member 62 which is telescopically extendable from an end of the body 61 to directly or indirectly contact an object so as to detect a displacement of the contact member 62 due to a displacement of the object, and converts the displacement of the contact member 62 into an electrical signal, to be outputted. The position detector 60 is screwed into an attaching bore 63, which is a screw bore formed at a position slightly eccentric with respect to a center of the positioning member 29, with an axis of the position detector 60 parallel to an axis L of the two-port valve C. The position detector 60 is fixed with a nut 65. The contact member 62 extends in the attaching bore 63 toward a piston chamber 23, with the end of the contact member 62 in contact with an upper surface of a plate 64 disposed at an end of the sleeve 35.

A device for converting the displacement of the contact member 62 into the electrical signal and outputting the electrical signal may be, for instance, of a type where the body 61 has a switch which is switched ON and OFF by the contact member 62, an optical type where the body has a photodetector capable of detecting the position of the contact member 62, and a linear scale type where the body 61 has a sensor which reads of counts magnetic scale. However, the device may be of any other types.

Two spring holes 66 are formed in the positioning member 29 at respective positions opposite to each other with respect to the center of the positioning member 29. A connecting spring 67 in the form of a coil spring is accommodated in each of the spring hole 66. One of opposite ends of each connecting spring 67 is held in contact with a rod-shaped spring seat 68 slidably accommodated in the spring hole 66, to bias the spring seat 68 onto the upper surface of the plate 64. The other end of each connecting spring 67 is in contact with a spring cover 69 in the form of an elongate and thin plate, which is attached at the upper surface of the positioning member 29 to cover the two spring holes 66. In FIGS. 8 and 9, reference numeral 70 denotes each of two screws fixing the spring cover 69. In this way, the spring force of the two connecting springs 67 keeps acting downward on the sleeve 35 via the plate 64 to hold the sleeve 35 held pressed against the first piston 24. Thus, the plate 64, the sleeve 35, and the first piston 24 are together moved upward and downward like a unit. The connecting springs 67 are for holding the plate 64, sleeve 35 and first piston 24 together or in contact with one another, and therefore not essentially necessary where these members 64, 35, 24 are integrally connected.

The spring cover 69 also serves as a fixing member for fixing the calibration plate 44 at a desired rotational position, and two opposite ends of the cover 69 are located on an internal circumferential edge of the calibration plate 44 to thereby hold down and fix the calibration plate 44. Accordingly, a fixing member in the form of a screw such as the cap screw 47 in the second embodiment is not used in the third embodiment. However, the third embodiment may be modified such that the spring cover 69 does not serve as a fixing member, and a fixing member in the form of a screw, such as the cap screw 47 is separately provided instead.

Although in the third embodiment the return spring 16 for the valve member 4 comprises a first spring 16*a* and a second spring 16*b* which have respective diameters, the return spring 16 may be constituted by a single spring as in the second embodiment.

In the two-port valve C, when the valve C is in the closed state with the valve member 4 in contact with the valve seat 6, the first piston 24 and the second piston 37 are at their return or lowermost position while held in contact with each other, and the sleeve 35 is pressed onto the upper surface of the piston 24 by the spring force of the connecting springs 67 exerted via the plate 64. In this state, the contact member 62 of the position detector 60 is extended to be in contact with the upper surface of the plate 64.

When pilot air is supplied to a first pressure chamber 26 during this state, the first piston 24 is lifted together with the second piston 37, sleeve 35, and plate 64 like a unit, up to the initial opening position where the plate 64 is brought into abutting contact with the positioning member 29, as shown in FIG. 8. With such a movement of the first piston 24, the contact member 62 is also displaced, by being pushed by the plate 64. The displacement is converted into an electrical signal. In this way, the operating position of the first piston 24 is detected by the position detector 60 via the plate 64 or sleeve 35.

By using as the position detector 60 the device of the type having the switch which is switched on and off by the contact member 62, or of the optical type where the photodetector detects the contact member 62, for instance, the first piston 24 having been displaced to the initial opening position or its stroke end can be detected in an on/off manner. Meanwhile, by using the device of the linear scale type where the sensor in the body 61 reads or counts the magnetic scale on the contact member 62, the position of the first piston 24 during its movement to the initial opening position can be detected throughout the movement.

The structure and operation of the third embodiment other than the part described above are identical with those of the first and second embodiments, and illustration thereof is omitted.

In the two-port valve D of the fourth embodiment as shown in FIGS. 10 and 11, an operating position of a first piston 24 is detected via a second piston 37. The two-port valve D does not have a plate 64 on an upper end of a sleeve 35 as used in the two-port valve C of the third embodiment, but a contact member 62 of a position detector 60 of the valve D is in direct contact with an upper or rear surface of the second piston 37. During the second piston 37 is moved together with the first piston 24 as a unit to an initial opening position, that is, the position where the upper end of the sleeve 35 is brought into abutting contact with a positioning member 29, as shown in FIG. 10, an operating position of the second piston 37 is detected by the position detector 60. The operating position of the first piston 24 is detectable by the detection of the operating position of the second piston 37 which corresponds to the operating position of the first piston 24. In this embodiment, it may be arranged such that the position of the second piston 37 is detectable throughout its movement or stroke, or such that the second piston 37 having moved to the initial opening position is detected in an on/off manner, just like the third embodiment.

The second piston 37 is thereafter driven from the initial opening position to its fully opening position by supplying pilot air to a second pressure chamber 27. The position detector 60 may continue to detect the operating position of the second piston 37 even during this driving, as needed. When such a continuous detection is employed, it may be arranged such that the operating position of the second piston 37 is detectable throughout the driving from the initial opening position to the fully open position, or such that the second piston 37 having moved to the fully open position or stroke end in an on/off manner.

In the third embodiment, a return spring 16 comprises a first spring 16*a* and a second spring 16*b* which have respective diameters. However, the return spring 16 may be constituted by a single spring as in the second embodiment.

In the third and fourth embodiments, the position detector 60 is of contact type where the contact member 62 extending from the body 61 contacts the plate 64 or second piston 37 as an object whose displacement is to be detected. However, a detector of non-contact type which detects the position of an object by directly emitting light, ultrasonic waves, etc. on the object may be used in place of the contact type detector.

I claim:

1. A two-port valve for vacuum operation, comprising:
an axis;
a main valve portion comprising:
a first main port;
a second main port;
a fluid passage connecting the first and second main ports;
a valve seat disposed in the fluid passage;
a valve member to be seated on and separated from the valve seat; and
a valve shaft extending along the axis of the valve from the valve member; and
a cylinder portion connected to the main valve portion along the axis of the valve, and comprising:
a cylinder housing defining a piston chamber therein into which the valve shaft extends;
a first piston which is slidably disposed in the piston chamber, and has a front end on the side of the main valve portion and a rear end on the side opposite to the main valve portion, the valve shaft slidably extending through a central portion of the first piston;
a sleeve which is disposed in the piston chamber to be movable along the axis, and limits an operating stroke of the first piston by being brought into abutting contact with the rear end of the first piston;
a positioning member which determines the position of the sleeve;
a second piston which is slidably disposed in the sleeve and connected to the valve shaft so as to be in contact with the first piston when the valve member is seated on the valve seat;
a first pressure chamber for driving the first piston;
a second pressure chamber for driving the second piston;
a first pilot port in communication with the first pressure chamber; and
a second pilot port in communication with the second pressure chamber.

2. The two-port valve of claim 1, wherein the positioning member is attached at an end of the piston chamber in the cylinder housing to be movable in the axial direction by a rotational operation around the axis, and an end of the positioning member is held in contact with an end of the sleeve.

3. The two-port valve of claim 2, further comprising a calibration plate which is attached at an external end face of the positioning member to be rotatable around the axis, and has graduation marks radially arranged thereon, and wherein the cylinder housing has a pointer for pointing the graduation marks on the graduation plate.

4. The two-port valve of claim 1, wherein a full stroke of the first piston is smaller than that of the second piston.

5. The two-port valve of claim 1, wherein the valve shaft has an indicator for indicating that the valve member is at its fully open position.

6. A two-port valve for vacuum operation, comprising:
an axis;
a main valve portion comprising:
a first main port;
a second main port;
a fluid passage connecting the first and second main ports;
a valve seat disposed in the fluid passage;
a valve member to be seated on and separated from the valve seat to close and open the valve; and
a valve shaft extending along the axis from the valve member; and
a cylinder portion connected to the main valve portion along the axis, and comprising:
a cylinder housing defining a piston chamber therein into which the valve shaft extends;
a sleeve which is movably disposed in the piston chamber and determines an initial opening position of the first piston;
a positioning member which determines the position of the sleeve;
a second piston which is slidably disposed in the sleeve and connected to the valve shaft;
a first piston which is slidably disposed in the piston chamber, and drives the second piston to an initial opening position of the second piston which corresponds to the initial opening position of the first piston determined by the sleeve, in an initial phase of opening of the valve;
a first pressure chamber for driving the first piston;
a second pressure chamber for driving the second piston;
a first pilot port in communication with the first pressure chamber; and
a second pilot port in communication with the second pressure chamber.

7. The two-port valve of claim 6, wherein the first piston has a front end on the side of the main valve portion and a rear end on the side opposite to the main valve portion, the sleeve and the second piston are disposed on the side of the rear end of the first piston, and the valve shaft slidably extends through a central portion of the first piston.

8. The two-port valve of claim 6, wherein the positioning member is attached at an end of the piston chamber in the cylinder housing to be movable in the axial direction by a rotational operation around the axis.

9. The two-port valve of claim 8, further comprising a calibration plate which is attached at an external end face of the positioning member to be rotatable around the axis, and has graduation marks radially arranged thereon, and wherein the cylinder housing has a pointer for pointing the graduation marks on the graduation plate.

10. The two-port valve of claim 6, wherein a full stroke of the first piston is smaller than that of the second piston.

11. The two-port valve of claim 6, wherein the valve shaft has an indicator for indicating that the valve member is at its fully open position.

12. The two-port valve of claim 6, further comprising a position detector for detecting an operating position of the first piston during the initial phase of opening of first piston.

13. The two-port valve of claim 12, wherein the position detector detects the operating position of the first piston via one of the sleeve and the second piston.

* * * * *